United States Patent [19]

Canty

[11] Patent Number: 4,746,178
[45] Date of Patent: May 24, 1988

[54] LIGHT PIPE FOR ILLUMINATING THE INTERIOR OF A PRESSURE VESSEL

[76] Inventor: Thomas M. Canty, 483 Fruitwood Ter., Williamsville, N.Y. 14221

[21] Appl. No.: 31,254

[22] Filed: Mar. 26, 1987

[51] Int. Cl.$^4$ ............................. G02B 6/00; F21V 7/04
[52] U.S. Cl. ................................. 350/96.10; 350/96.18; 350/96.20; 362/32; 362/457; 220/3
[58] Field of Search .............. 350/96.10, 96.18, 96.20, 350/96.26, 96.29; 362/32, 457; 220/3

[56] References Cited

U.S. PATENT DOCUMENTS

| | | | |
|---|---|---|---|
| 3,446,952 | 5/1969 | Sitter et al. | 362/32 |
| 3,582,637 | 6/1971 | Cecil, Jr. | 350/96.22 |
| 3,813,514 | 5/1974 | Canty | 350/96.20 X |
| 3,990,778 | 11/1976 | Magee et al. | 350/96.25 X |
| 4,273,109 | 6/1981 | Enderby | 350/96.26 X |
| 4,509,104 | 4/1985 | Suzuki et al. | 362/32 |
| 4,669,818 | 6/1987 | Myer | 350/96.20 |
| 4,681,086 | 7/1987 | Van Patten | 350/96.10 |
| 4,711,524 | 12/1987 | Morey et al. | 350/96.25 |

FOREIGN PATENT DOCUMENTS 53-143343 12/1978 Japan ................................ 350/96.20

Primary Examiner—William L. Sikes
Assistant Examiner—Brian M. Healy
Attorney, Agent, or Firm—James J. Ralabate

[57] ABSTRACT

A light pipe unit for supplying illumination to the interior of a vessel that has an attachment means for connection to the vessel. The light pipe unit is constructed of a metallic housing having an elongated fiber optic rod contained therein. At the bottom portions of the rod and housing, that is the portions extending into the vessel, is a glass laminate. The glass laminate covering forms a substantially corrosion-proof seal across the entire distal or lower portion of the unit.

9 Claims, 1 Drawing Sheet

LIGHT PIPE FOR ILLUMINATING THE INTERIOR OF A PRESSURE VESSEL

This invention relates to light pipes used to supply illumination to the interior of a vessel or other enclosure and, more particularly, to a novel corrosion-resistant light pipe unit.

BACKGROUND OF THE INVENTION

There are various known lighting means for supplying radiant energy from an external source to the interior of a pressure vessel. There are several required criteria for these units. They must provide the necessary light intensity for proper viewing of the vessel contents and yet must be safe to use. Conventional lighting such as bulbs and normal household electrical units obviously cannot be used and therefore light pipes that transmit light from a light source have found acceptance in pressure vessel use. The light pipes should optimumly be explosion-proof, have proper intensity and be substantially resistant to the vessel contents. Many known fiber optic materials that transmit energy and light from a light source have been used as the primary material in these light pipe units. In some lighting systems a bulb is shined through a window in the pressure vessel tank and a great deal of the light is reflected away. So, while these type systems are substantially expolsion-proof and safe, they suffer from the drawback that a substantial portion of the light intensity is lost.

Since many corrosive liquids and gases are used in pressure vessels and since many pressure vessels are used outdoors, it is important that the light pipe unit be as corrosion resistant as possible. In Applicant's company's U.S Pat. No. 3,813,514 a light pipe unit is disclosed wherein the pipe supplies radiant energy to the interior of a pressure vessel having an internal operating pressure differing from ambient pressure external to the vessel. That disclosed unit had an elongated optical light pipe with an integral frusto-conical shaped mounting surface on one terminal portion and a rounded roughened opposite terminal portion. The pipe extends beyond the internal wall of the pressure vessel and has an inner diffuser end portion to achieve proper light dispersion. After prolonged use this type of light unit becomes corroded because of the deleterious nature of the vessel components and requires maintenance or replacement. A lighting unit compatible and adaptable to existing vessels and light (including U.V and I.R light) with improved corrosion resistance has become required but heretofore not been available.

SUMMARY OF THE INVENTION

It is therefore an object of this invention to provide a pressure vessel lighting unit devoid of the above-noted disadvantages.

Another object of this invention is to provide a safe, effective and durable light pipe for use in pressure vessels.

Still another object of this invention is to provide a light pipe unit that is substantially more corrosion resistant than previously known light pipes.

Yet another object of this invention is to provide an explosion-proof light pipe that is compatible with presently existing equipment such as light sources and pressure vessels.

Yet still another object of this invention is to provide a novel light pipe that does not project into the vessel interior but yet provides a very intense beam of visible light.

These and other objects are accomplished by the present invention generally speaking by providing a cylindrical configured light pipe unit having a substantially flat terminal end portion. The light pipe has positioned across its flat terminal portion a laminate that has an index of refraction that is substantially the same as that of the pipe so that the loss of radiant energy is minimal. The cylindrical pipe is housed in a metal enclosure usually constructed from low carbon steel or stainless steel. The flat terminal portion of the light pipe is coextensive with the terminal portion of the metal enclosure. The laminate extends across the flat terminal face of the light pipe and across the adjacent surface of the metal enclosure to at least the outer gasket diameter of the mating flange. The laminate bonds the pipe face to the glass-metal interface and seals those portions against corrosion. Generally, this type of arrangement would be considered to be adverse to proper lighting, however, with the appropriate adhesive and appropriate laminate, the loss of lighting is minimal. The objective is to match the index of refraction so the components are close to being optically one piece. The construction of the light pipe unit will be described in more detail with reference to the drawings.

The light pipe or rod and laminate can be constructed of glass, acrylics or other suitable fiber optic materials. It is important that the index of refraction of the laminate approximate that of the light pipes to ensure a minimal loss of light and energy. The glass material may be constructed of any conventional glasses such as borosilicate glasses, soda lime glasses, MICA glasses or mixtures thereof. The acrylic material can be any acrylic plastic for transmitting radiant energy in the form of light or heat from an external source. The cylindrical metal enclosure can be made from any suitable metal such as steel, low carbon steel, stainless steel, lead-free steel, nickel-plated steel, or mixtures thereof. The cylindrical enclosure can also be constructed from KOVAR, TEFLON, hastalloy or glass-lined materials. It is preferred, however, to use a steel enclosure since, in the preferred embodiment, the cylindrical light pipe is heat fused to the interior wall of the steel enclosure thus making it structurally more sound. The laminate in any case makes it substantially corrosion resistant.

The lighting structures of this invention are ideal for illumination of autoclaves, process vessels and equipment, sterilizers, vacuum pressure impregnation, diving decompression chambers, altitude chambers, environment chambers and, in particular, pressure vessels used in research and industry. It can be used in pressure vessels at temperatures ranging from up to 1000° F. and pressures exceeding 11,000 P.S.I. In addition, the light pipe unit of this invention can be used with any suitable light source or radiant energy source such as those disclosed in U.S. Pat. Nos. 3,582,637 and 3,813,514. The structure of the light pipe unit allows for a very intense beam of visible light illumination or radiant energy to cross the pressure or environmental boundary which means visible energy for viewing U.V (ultraviolet) energy for photochlorination and I.R (infrared) for heat or other reactions. Once across the boundary the light beam can be diffused or condensed producing a wide range of light outputs. The light pipe can mate with an infinite variety of couplings such as 1" and 1½" NPT, flanges, straight thread, "O" ring sealed, sanitary and dairy fittings. The radiant energy output can be used for sensors, sterilization, heating, chemical reactions or other functions.

DETAILED DESCRIPTION OF THE DRAWING AND PREFERRED EMBODIMENT

Figure 1:
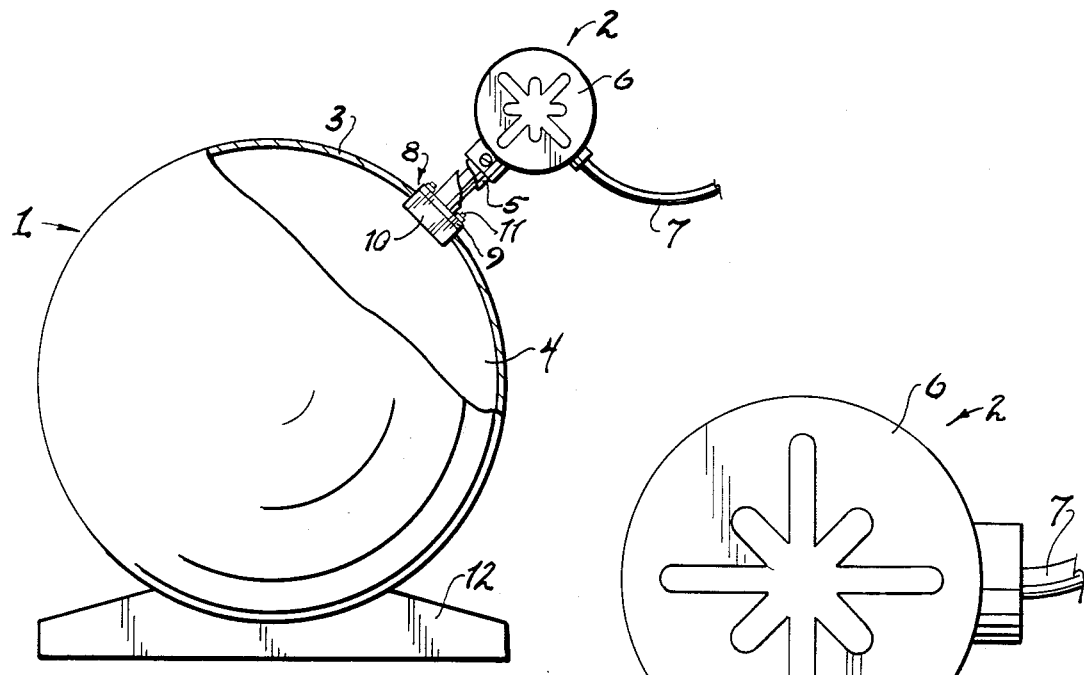
FIG. 1 is a side view of a pressure vessel showing an example of the position of the lighting unit of this invention.

In FIG. 1 a pressure vessel 1 is shown having the lighting unit 2 attached thereto and optically extending through the wall 3 of vessel 1, to provide visibility and lighting to the interior 4 of vessel 1. Vessel 1 will have a viewing window from which the interior can be viewed. This window is not shown in the drawing since it is not necessary to understand the present invention. Light rod or pipe 5 transmits light from a light source 6 (such as a bulb or other light energy-producing means) into the interior 4 of vessel 1. The light source 6 is connected to a power supply via cable 7 such as a source of electricity and is fixed to elongated light pipe 5 in a manner whereby light is transmitted through the fiber optic material of the elongated light pipe into the interior 4. A fixture or flange retainer 8 is used to mount the entire light unit made up of light pipe 5 and light source 6 to the vessel 1. Mounting fixture 8 is of a two-part construction having an outer flange or bracket 9 and an inner flange 10 (or wall 3). Extending through these retainers or flanges or brackets 9 and 10 are bolts 11 that lock the flanges or brackets in position. In lieu of inner flange or bracket 10 the wall 3 of vessel 1 may be used wherein the bolts 11 thread into and fix the unit 2 to the wall 3 of vessel 1. Any suitable manner of attaching light unit 2 may be used provided elongated light pipe 5 is capable of shining light through an aperture in wall 3 into interior 4. This includes a threaded retaining ring or a clamping ring (e.g. Tri Clamps). Mounting fixture 10 is adapted to be fixed to vessel 1 in a pressure-fluid-sealed manner (such as welded) so as not to interfere with the interior working area of the vessel 1. Vessel 1 is suitably supported on a base support 12.

Figure 2:
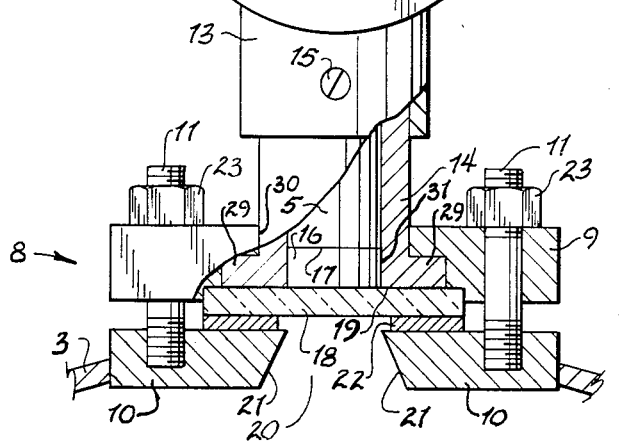
FIG. 2 is an expanded cutaway side view of the lighting unit as attached to a light source and pressure vessel.

In FIG. 2 the light unit 2 is shown in a cutaway expanded view. Light source 6 can be of any suitable configuration such as that shown in U.S. Pat. No. 3,813,514. Projecting from the bottom portion of light source 6 is a sleeve 13 having a hollow tubular housing 14 adapted to telescopically receive a terminal portion of elongated light pipe 5. Tubular housing 14 which is preferably made of low carbon steel has acrylic, or other suitable fiber optic material light pipe 5 shrink-fit or fused to the interior face of said tubular housing 14. The terminal portion of housing 14 housing light pipe 5 is inserted into sleeve 13 and fixed therein by one or more screw tighteners 15. The opposite terminal end of light pipe 5 has attached thereto glass disc 16 which is fused to the inner wall of metal tubular housing 14. Thus, glass disc 16 is fixed in place by being fused to the inner side or wall of housing 14 and adhesively fixed to terminal end portion 17 of light pipe 5.

Fused glass disc 16 is used due to the reliable seal, high strength and impact-resistant barrier it provides the light pipe 5. Pressures exceeding 5,000 P.S.I. at temperatures of 650° F. can be withstood by the use of fused glass barrier disc 16 as shown in FIG. 2. This part 16 gives reliability against static pressure and safety against thermal shock or impact unattainable with gasketed optical barriers. In addition, by use of disc 16, operating temperature range is increased to over 1,000° F. at low pressure. A glass laminate or face 18 is adhesively fixed to the lower face of disc 16 to the lower face of L-flange 29, and the lower face 19 of outer bracket 9. The laminate 18 has an index of refraction substantially equal to that of pipe 5 to minimize any loss of transmitted energy. Laminate 18 extends over and is wider than the opening or aperture 20 in the wall of vessel 1 or central of outer flange 10. The opening 20 may be flared as shown in drawing at 21 to allow a diffused ray of light to shine through or can have concentric or straight rather than a flared opening 21. In situations where it is desired to project a concentrated beam of light into pressure vessel 1, inlet opening or aperture 20 will have non-flared or straight side wall (as shown at 27 in FIG. 3) openings. To diffuse light or direct light into all corners of the pressure vessel 1, a conically-shaped or flared inlet 21 at aperture 20 is used. The unit 2 can be attached directly to side or wall 3 of vessel 1 or can be attached to an inner bracket 10 which in turn is attached to wall 3. A bolt or bolts 11 extend from an outer bracket 9 into wall 3 or an inner flange bracket 10. The inner flange or bracket 10 is positioned below or on same plane as wall 3, thus wall 3 would be located adjacent inner bracket 10. Outer bracket 9 has a centrally-located aperture 30 through which housing 14 and light pipe 5 fit to be locked in place when adhesively assembled to flange 9 by laminate 18. Located at the lower end of light pipe 5 is a glass disc 16 which is fused to housing 14 to provide the high pressure and high temperature barrier. This gives the light pipe its strength and stability. Disc 16 is heat fused to the lower inner wall 31 of metallic housing 14 to fix it in place. The heat fuse can be accomplished by any known method of fusing such as described in *Glass Engineering Handbook,* Third Edition, Chapter 5, 1984, Library of Congress #ISBN 0-07-044823-X by G. W. Mclellan and E. B. Shand. Adhesively fixed to the lower face of disc 16 is a glass laminate 18 which extends laterally beyond the width of aperture 20 and normally to the gasket 22 outside diameter. Laminating is disclosed in this same book Chapter 8, pg.11–14, all of which are hereby incorporated by reference in the present disclosure. The laminate 18 does not interfere with the transmission of light and provides maximum corrosion protection to the components of light unit 2. Positioned between laminate 18 and the wall 3 of vessel 1 or bracket 10 is a ring gasket 22 which provides structural protection for laminate 18 and enhances the pressure-fluid seal of unit 2 on vessel 1. Screw-tightening means 15 is used to lock housing 14 in place in sleeve 13. Bolts 11 are tightened by nuts 23 which are threaded downward when tightened.

Figure 3:
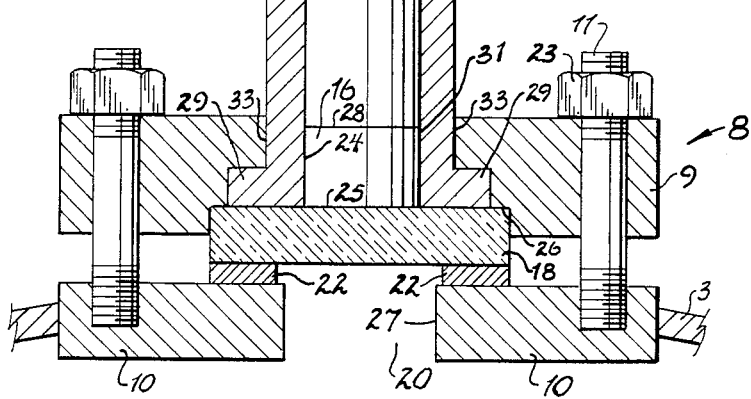
FIG. 3 is a side breakaway view of the lighting unit of this invention.

In FIG. 3 the light unit 2 without the light source 6 is illustrated in an expanded breakaway view. An acrylic (or other fiber optic material) light pipe or rod 5 is shrunk fit or molded in the interior 32 of tubular metallic housing 14. Metallic housing 14 has a base portion which has an L-shaped flanged annular section 29 having glass disc 16 fused to its interior wall or sides 24. The upper face of glass disc 16 is adhesively fixed to the lower or distal portion 28 of light pipe 5 by use of a sealtight hardenable compound such as cyanoacrylate or other suitable glass adhesive. When hardened, this compound fixes the laminate 18 which is made from glass, Pyrex, quartz, Mica, or other suitable glass, to the bottom portion 25 of fused glass disc 16 and the bottom portion 26 of flanged section 9 and the bottom of L-shaped flange 29. Disc 16 may be constructed of soda lime glass, borosilicate glass or other suitable glasses. Thus as shown in the drawing, laminate 18 is fixed to the entire distal or bottom portion of disc 16 and metal housing 14 and extends beyond the width of aperture 20 to provide corrosion protection. It also extends to the outer diameter of gaskets 22. The sides 27 of aperture 20 are shown as straight rather than flared as shown at 21 in FIG. 2; either configuration is included within the invention. "O" ring or other appropriate gaskets 22 are positioned between wall 3 (or in lieu of wall 3 may be bracket 10 or a stud pad or weld neck in wall of vessel) and laminate 18. While this FIG. 3 shows the unit 2 attached to bracket 10 it can be attached directly to wall 3 as shown in FIG. 1. Outer flanges or bracket 9 may be of a circular configuration having a central aperture 33 through which housing 14 fits.

The light pipe can be made with a fused rod extending from the face of 18 to the end of 14 replacing the acrylic rod 5. This can be done for extreme pressures and temperatures.

The preferable method of construction uses a fused disc 16 to withstand high differential pressures and temperatures and an acrylic rod 5 to efficiently transmit the light. The acrylic or glass has highly polished sides and can have a flat or conical input end to give either a narrow or wide beam output. Acrylic is preferred due to machinability and ability to press fit. The glass option of 5 can be laminated to item 5 for better optical transmission.

The method of construction using part 16 and 5 has improved radiant energy transmission since light is reflected off the walls as in a fiber optic light guide and then transmitted through disc 16 and facing 18. In the design using only a glass rod 16 the light does not reflect off the fused wall of the light pipe thus giving a lower net light output into the process area.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A light pipe unit for supplying illumination to the interior of a vessel which comprises means for attachment to said vessel, a metallic housing and a light pipe, said light pipe comprising an elongated rod constructed of a fiber optic material said rod encased in a tubular metallic housing, said rod having fixed to its distal end portion a glass disc, and a glass laminate fixed to the bottom portions of said disc and said metallic housing forming thereby a substantially corrosion-proof seal across the entire distal end portion of said light unit, said light pipe constructed from a material selected from the group consisting of acrylics, glases and mixtures thereof, said laminate is a glass constructed from a material selected from the group consisting of borosilicate glass, soda lime glass, MICA glass and mixtures thereof, and wherein said glass disc is fused to the distal end interior portion of said metallic housing.

2. The light unit of claim 1 wherein the upper portion of said housing is adapted to be connected to a source of light and wherein the distal end portion of said housing is adapted to be fixed to said laminate.

3. A light pipe adapted to supply radiant energy to the interior of a vessel comprising an elongated fiber optic rod, a metallic housing containing said rod, a glass disc, and a laminate, said rod having adhesively attached to its lower terminal portion said glass disc, said disc heat fused to the interior portion of said housing and having a lower terminal portion coextensive with the lower terminal portion of said housing, said laminate adhesively fixed to said terminal portion of said housing and said terminal portion of said disc to form thereby a substantially corrosion-resistant seal across the entire bottom portion of said light pipe.

4. The light unit of claim 3 wherein said light pipe is constructed from a material selected from the group consisting of acrylics, glasses and mixtures thereof.

5. The light unit of claim 3 wherein said laminate is a glass made from a material selected from the group consisting of borosilicate glass, soda lime glass, MICA glass or mixtures thereof.

6. The light unit of claim 3 wherein the upper portin of said housing is adapted to be connected to a source of light and wherein the lower portion of said housing is adapted to be fixed to said laminate.

7. The light pipe of claim 3 wherein said laminate has an index of refraction substantially equal to that of said rod.

8. The light pipe of claim 3 wherein said disc has an index of refraction substantially equal to that of said rod.

9. The light pipe of claim 3 wherein said adhesive has an index of refraction substantially equal to that of said rod.

* * * * *